United States Patent [19]

Davis et al.

[11] Patent Number: 5,761,298
[45] Date of Patent: Jun. 2, 1998

[54] COMMUNICATIONS HEADSET WITH UNIVERSALLY ADAPTABLE RECEIVER AND VOICE TRANSMITTER

[75] Inventors: Michael G. Davis, Dallas, Oreg.; David G. Harting, Needham, Mass.; Scott F. Burr, Felton, Calif.; Robert V. Davies, Scotts Valley, Calif.; Robert J. Bernardi, Scotts Valley, Calif.

[73] Assignee: Plantronics, Inc., Santa Cruz, Calif.

[21] Appl. No.: 658,838

[22] Filed: May 31, 1996

[51] Int. Cl.$^6$ .................. H04M 1/00; H04R 25/00
[52] U.S. Cl. .................. 379/430; 381/183; 381/187
[58] Field of Search .................. 379/430, 428, 379/433; 381/183, 187, 68.5, 68.6, 68.7, 69

[56] References Cited

U.S. PATENT DOCUMENTS

| | | | |
|---|---|---|---|
| D. 375,959 | 11/1996 | Davis et al. | D14/223 |
| 2,485,405 | 10/1949 | Olney et al. | 179/102 |
| 3,440,365 | 4/1969 | Bryant et al. | 179/156 |
| 3,610,841 | 10/1971 | Hutchings | 179/156 |
| 4,335,281 | 6/1982 | Scott et al. | 179/156 |
| 4,429,194 | 1/1984 | Kamon et al. | 179/182 |
| 4,617,431 | 10/1986 | Scott et al. | 179/156 |
| 4,893,344 | 1/1990 | Trägardh et al. | 381/187 |
| 4,917,504 | 4/1990 | Scott et al. | 381/187 |
| 5,210,792 | 5/1993 | Kajihara | 379/430 |
| 5,345,509 | 9/1994 | Hofer et al. | 381/68.6 |
| 5,381,486 | 1/1995 | Ludeke et al. | 381/187 |
| 5,414,769 | 5/1995 | Gattey et al. | 379/430 |
| 5,446,788 | 8/1995 | Lucey et al. | 379/430 |
| 5,448,646 | 9/1995 | Lucey et al. | 381/74 |
| 5,450,496 | 9/1995 | Burris et al. | 381/183 |
| 5,469,505 | 11/1995 | Gattey et al. | 379/430 |
| 5,533,122 | 7/1996 | Gattey et al. | 379/430 |

FOREIGN PATENT DOCUMENTS

| | | |
|---|---|---|
| 3210034 A1 | 3/1982 | Germany. |
| 93 13 223.9 | 4/1993 | Germany. |

*Primary Examiner*—Jack Chiang
*Attorney, Agent, or Firm*—Fenwick & West LLP

[57] ABSTRACT

A communications headset includes a headset enclosure and a receiver enclosure coupled thereto by various means allowing displacement of the receiver enclosure with respect to the headset enclosure at any of a variety of angles, rotations, and distances. The adaptable positioning of the receiver enclosure allows the headset to be used by a wide variety of users having different ear shapes and sizes, while providing a stable, comfortable fit and ensuring good acoustic performance. In one embodiment the receiver enclosure is slidably coupled to a ball tube having a ball that rests in a socket of the headset enclosure. The receiver enclosure can telescope along the length of the ball tube and can rotate about an axis of the tube. The ball can be rotated in the socket to position the receiver enclosure at any of a variety of angles relative to the headset enclosure. A voice transmitter is also coupled to the headset enclosure so as to allow adjustment of length, angular position, and rotation.

6 Claims, 9 Drawing Sheets

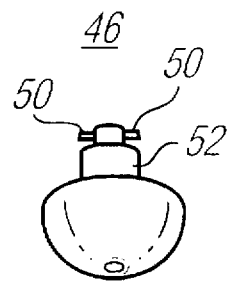 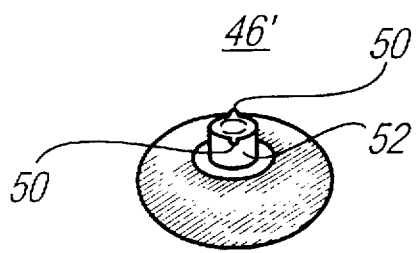
FIG. 4  FIG. 5
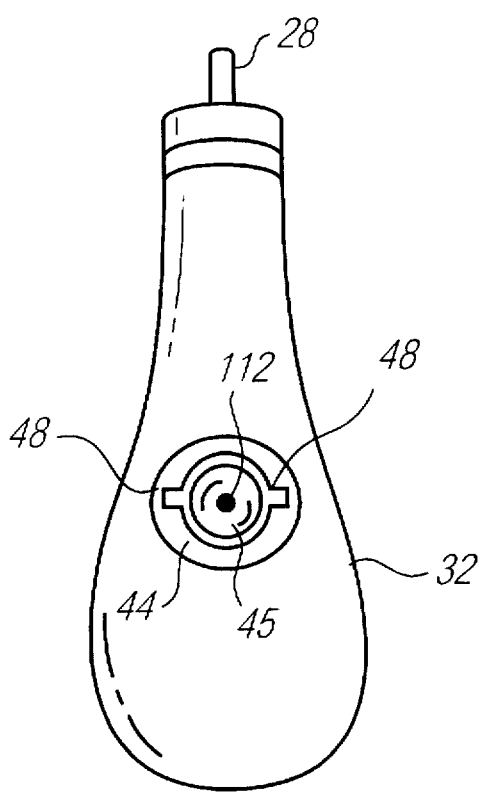
FIG. 6

COMMUNICATIONS HEADSET WITH UNIVERSALLY ADAPTABLE RECEIVER AND VOICE TRANSMITTER

FIELD OF THE INVENTION

This invention relates generally to communications headsets, and more particularly to self-supporting, monaural headsets containing a microphone and a receiver.

BACKGROUND OF THE INVENTION

Communications headsets can be used in a diversity of applications, and are particularly effective for telephone operators, radio operators, aircraft personnel, and for other situations wherein it is desirable to support "hands free" access to communications systems. Accordingly, a wide variety of headsets are known in the prior art.

Known communications headsets can be broadly characterized on the basis of several fundamental aspects of their design and function, including: whether they deliver monaural or binaural sound; whether they employ an invasive ear tip or a non-invasive loudspeaker in establishing a receiver-to-ear acoustical coupling; how they are physically supported on the user; their acoustical characteristics; and their ergonomic qualities.

Typically in the art, headsets which deliver binaural sound (i.e. ones which have acoustical transducers for both ears) may utilize some type of headband arrangement to secure receiver elements beside each ear. Although generally providing very stable support for the headset, headbands have the disadvantages that they increase the size and weight of the headset, and tend to be uncomfortable and obtrusive to the user.

Monaural headsets (having only a single receiver situated near one ear) may be either right-handed or left-handed, or may incorporate a single design adaptable to left or right ear use. Monaural headsets may be implemented with either a headband supporting a single receiver element, or with an earhook that fits around the ear. Such earhook headsets may be quite compact, and therefore may not require the stability provided by a headband. However, uneven weight distribution can be a problem for earhook monaural headsets, since the majority of the headset components are concentrated on one side of the head. Conventional self-supporting earhook headsets typically rely on either a clamping mechanism to grip the user's ear, or a dual point retention system using opposing leverage against the ear by portion of the earhook itself.

Ergonomic considerations in the design of communications headsets include the comfort of the device, the ease of putting the headset on and subsequently adjusting it for use, the stability of retention, the restriction of user mobility resulting from the wearing of the headset, as well as the quality of sound delivered by the device. Comfort and stability of the headset on the ear is believed to be among the most critical ergonomic considerations. Acoustical qualities of communications headsets are often closely dependent on other aspects of the design. For example, the acoustical quality of the sound heard by a user is clearly affected by the nature of the receiver-to-ear seal. Invasive ear tips provide a good seal, but can suffer from problems of comfort and hygiene. Non-invasive loudspeaker-type receivers, on the other hand, are more susceptible to acoustical degradation from background-level sound and attenuation of the acoustical wave passing through open space from the receiver to the auditory meatus.

Another acoustical problem results from the arrangement and size of components in a headset. Naturally, it is desirable to utilize microphones and receivers of the smallest possible size and least weight, making the resulting headset as light and compact as possible. Typically, however, smaller components deliver a weaker and/or lower quality acoustical signal, and must accordingly be closely coupled to the user. Given the number of different considerations and constraints to be satisfied, it can be seen that headset design requires balancing many different, often competing considerations.

Further, it is well known that there are large variations in the physical characteristics of population in terms of the size, shape, and structure of the ear and the head, the position of the ear on the head, and other biometric concerns. Because of the large amount of variation between users, conventional approaches to headset design, particularly for earhook headset, tend to result in a headset that is comfortably and stably worn by only a fraction of the population of users. For example, design tradeoffs to reduce size and weight and increase acoustical performance, may require a headset that is limited in the flexibility of applications, such as to only one ear, or ears within a certain size range, or requires specific means to clamp or secure the earhook. Any of these constraints may make the headset unusable or uncomfortable for a large number of users who do not have conforming ear shapes, sizes and positions. In other cases, making the headset comfortable for a large variety of users results in a lower quality of acoustic performance due to improper acoustic coupling of the receiver to the ear.

One area of particular discomfort and variation in users is the size of the concha, the cavity surrounding the opening to the ear canal. Some headsets have an earbud that is placed in the concha, typically to provide a better acoustic coupling to the ear canal. Typically, the earbuds are non-removably coupled to the receiver of the headset. The earbud being fixed in size, it typically is sized on the assumption that it will fit a large number of users. However, given the variations in users, such an approach will not provide a comfortable solution to all users.

Accordingly, it is desirable to provide an earhook headset that is comfortable and stable for a large variety of users having varying physical characteristics, while providing high quality acoustic performance.

SUMMARY OF THE INVENTION

The present invention overcomes the limitations of conventional headset designs by providing a lightweight, self-supporting headset which can be comfortably and securely fitted to a wide range of users without undue individual attention. The headset of the present invention may be easily adjusted and fitted so as be worn comfortably and in a firm and stable fashion around the ear of a wearer.

The foregoing and other features are achieved in accordance with the present invention by providing a headset including a receiver enclosure carried by a headset enclosure having an arcuate ear hook. The receiver enclosure is coupled to the headset enclosure by an attachment member that allows the receiver enclosure to have at least three degrees of freedom in its position relative to the body of the headset enclosure, including rotation about an axis with respect to the headset enclosure, and movement in and through a plane of the headset enclosure that is approximately parallel to the plane of the ear.

The freedom of movement and rotation provided to the receiver enclosure by the attachment member enables the headset to be used on either ear, and for the receiver enclosure to be positioned in any of numerous locations, comfortably placing the receiver in the concha of the ear.

Once placed in the concha of the ear, the receiver enclosure and headset enclosure form a stably, trilaterally supported structure. This arrangement makes the receiver enclosure universally adaptable with respect to a large variety of users having various shapes and sizes of ears.

Additionally, the receiver enclosure may be coupled to the headset enclosure so as to move toward and away from the headset enclosure along the axis, increasing or decreasing the distance between the receiver enclosure and the headset enclosure. This feature further increases the flexibility and adaptability of the headset to various users, by accomodating different size and shape ears.

The receiver enclosure is coupled to the headset enclosure by the attachment member so that the electrical circuitry for a receiver transducer in the receiver enclosure passes from the headset enclosure through the attachment member to the receiver enclosure. This feature reduces the likelihood of damage to the leads from external exposure to the user environment, without impairing the adaptability of the headset. In addition, this feature enables the leads to enter the headset enclosure from behind the user's ear, such that the connecting cable hangs down behind the ear, rather than in front or along side of it. This further increases the user's comfort and the stability of the headset by beneficial weighting and distribution of mass.

The coupling of the receiver enclosure to the headset enclosure to enable the freedom of movement and position may be achieved through various implementations of the attachment member. In one embodiment, the receiver enclosure is coupled to the headset enclosure by a ball and socket mechanism. The ball and socket portion reside in the headset enclosure. The ball has a bored cavity and is coupled to a receiver tube that extends from the headset enclosure to the receiver enclosure. The ball and socket allow the receiver enclosure to move freely through a number of angular positions with respect the headset enclosure. The receiver enclosure is also able to rotate about the receiver tube. Through the cavity of the ball and the receiver tube pass the electrical conductors of a receiver circuit to the transducer in the receiver enclosure.

In another implementation the attachment member is a universal joint, again allowing the receiver enclosure to be disposed with respect to the headset enclosure at any of a variety of angles and positions. In yet another implementation, the receiver enclosure couples to the headset enclosure with a flexible, extendible member, such as corrogated tube.

To further aid in the adaptability of the headset of the present invention to a variety of users, a voice transmitter, such as a voice tube or microphone boom, is coupled to the headset enclosure and has a variable length, being movable toward and away from the headset about an axis along the length of the voice transmitter. The variable length of the voice transmitter enables it to adjusted for variations in the distance between the user's mouth and the ear. Also, the voice transmitter may be coupled to the headset enclosure so as to rotate about its axis, thereby providing further precision in the placement of the voice transmitter relative to the user' mouth. The voice transmitter may be a tube conducting the user's voice to a microphone in the headset enclosure, or the microphone may be placed at the distal end of the voice transmitter, with electrical conductors passing to a transmitter circuit in the headset enclosure.

Another feature of the present invention is the detachable coupling of earbuds of different sizes and shapes to the receiver enclosure. The receiver enclosure includes a socket onto which an earbud detachably mounts and acoustically couples, communicating acoustical signals from the receiver transducer to the ear canal of the user. This arrangement enables interchangeable earbuds, allowing the user to select an earbud that is most comfortable from a variety of differently sized and shaped earbuds. This feature further increases the universal adaptability of the headset to different users.

BRIEF DESCRIPTION OF THE DRAWINGS

FIG. 4 is a top, perspective view of one detachable earbud.

FIG. 5 is a bottom perspective view of another detachable earbud.

FIG. 6 is a front view of the receiver enclosure and mounting socket.

DETAILED DESCRIPTION OF THE PREFERRED EMBODIMENTS

Figure 1:
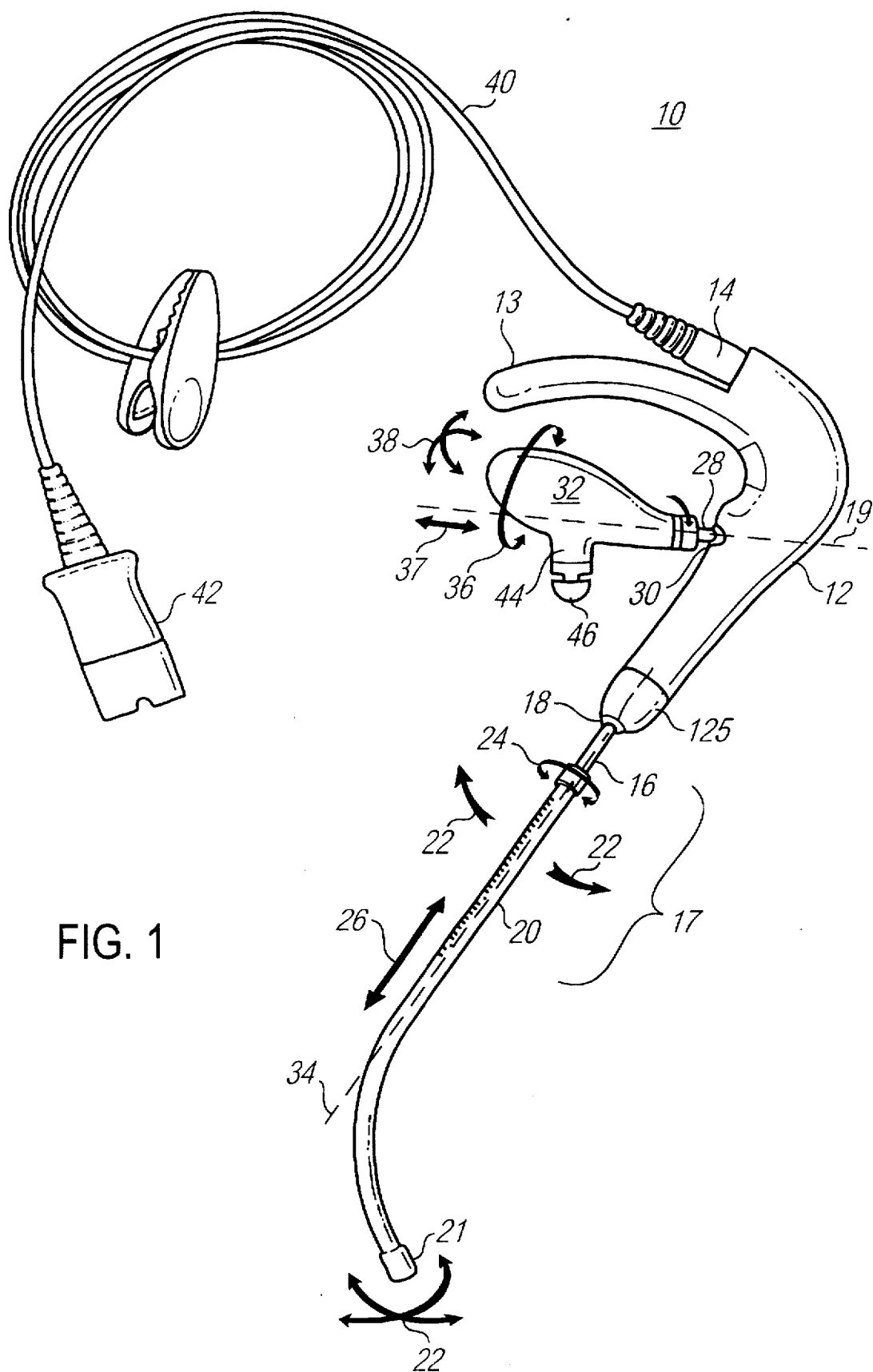
FIG. 1 is a side view of a headset in accordance with the present invention and illustrating the rotation, angular displacement, and axial extendibility of the receiver enclosure and voice transmitter with respect to the headset enclosure.
Figure 2:
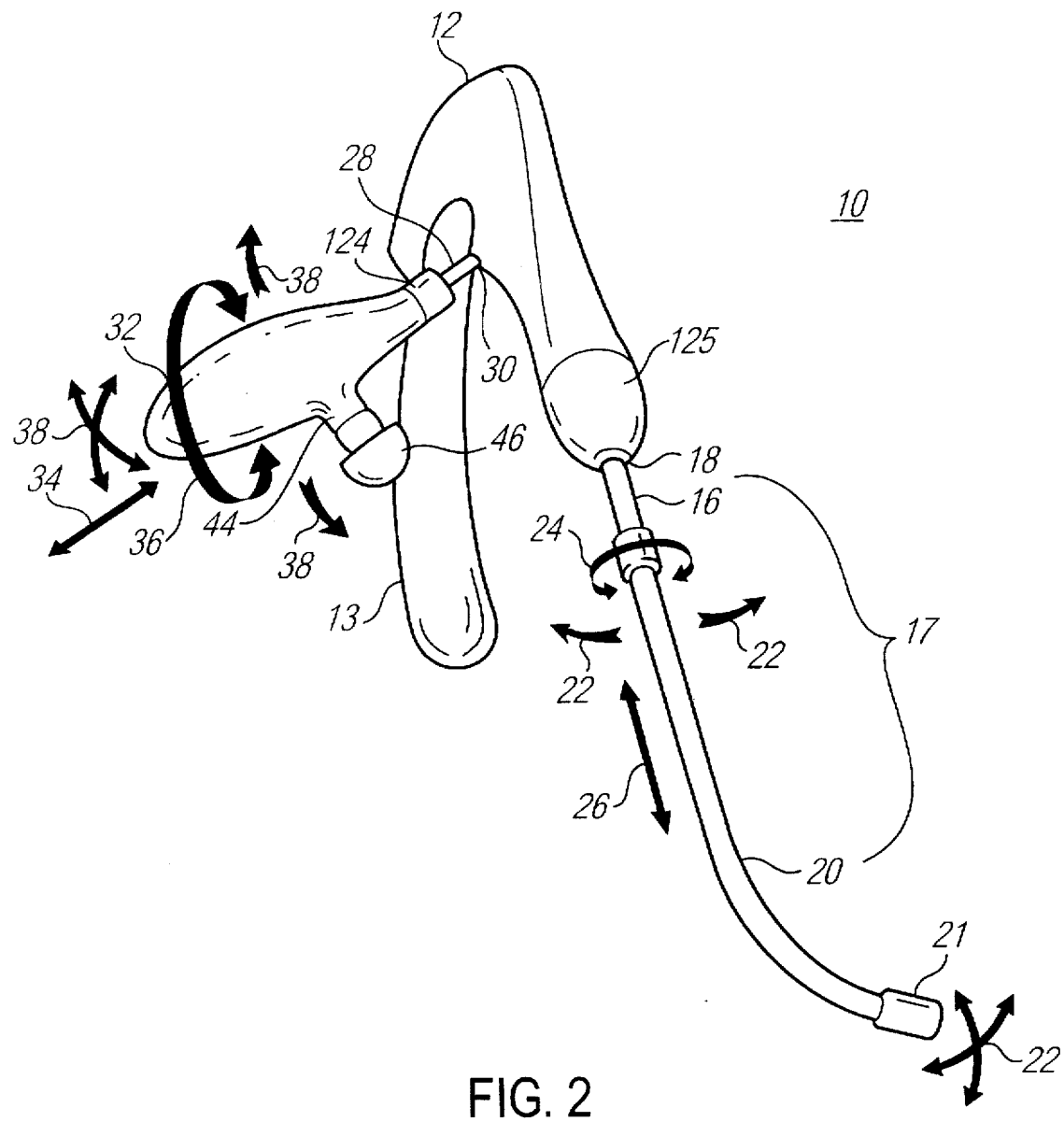
FIG. 2 is a front view of the headset shown in FIG. 1.

Referring first to FIGS. 1 and 2, there is illustrated one embodiment of a headset in accordance with the present invention. Headset 10 includes a headset enclosure 12 having an arcuate earhook 13. The earhook 13 and body of the headset enclosure 12 lie substantially in a vertical plane parallel to the plane of the ear.

Coupled to the headset enclosure 12 are a voice transmitter 17 and a receiver enclosure 32. Headset enclosure 12 contains a first cavity (not shown) in which reside transmitter and receiver circuits.

The receiver enclosure 32 couples to the headset enclosure 12 by an attachment member. In one embodiment, the attachment member is a ball tube 28 extending from the receiver enclosure 32 to a socket 30 on the headset enclosure 12. An axis 19 passes through the ball tube 28 and the receiver enclosure 32. Ball tube 28 and socket 30 together facilitate the angular adjustment of receiver enclosure 32 with respect to headset enclosure 12, as indicated by arrows 38. Generally, receiver enclosure 32 may be positioned such that the ball tube 28 and axis 19 lie at any of plurality of angles either passing through or in the plane of the headset enclosure 12, as variously indicated by arrows 38. This freedom of positioning enables the headset 10 to be adaptively configured by a large variety of different users, as further detailed below.

In this preferred embodiment, receiver enclosure 32 is slidably engaged over ball tube 28, enabling receiver enclosure 32 to be telescopically extended or retracted along the ball tube 28 (on axis 19) with respect to headset enclosure 12, as indicated by arrow 37. This enables the receiver enclosure 32 to be positioned at various distances from the headset enclosure 12, accommodating many different size ears.

Further, receiver enclosure 32 is rotatable about the ball tube 28 on axis 19 with respect to headset enclosure 12, as indicated by arrow 36. The range of rotation of receiver enclosure 32 in the direction of arrow 36 is preferably at least 180°. This range of rotation enables headset 10 to be worn over either a user's right or left ear. It further enables the receiver enclosure 32 to be more precisely oriented toward the concha of the ear, again fitting a larger number of users, and increasing the quality of the acoustic seal between the receiver enclosure 32 and the concha.

Collectively, ball tube 28, socket joint 30, and the telescopic and rotatable engagement of receiver enclosure 32 with respsect to headset enclosure 12 enable headset 10 to accommodate a variety of ear sizes, positions, and orientations, thereby enabling a comfortable, and stable placement for many different users.

In one embodiment, the voice transmitter 17 includes a voice tube arm 16 and a voice tube 20. In this embodiment, the user's voice is conducted through the voice transmitter 17 to a microphone (not shown) disposed within headset enclosure 12. Voice signals are converted to electrical signals and applied to a transmitter circuit disposed within headset enclosure 12. The voice tube arm 16 extends out of a forward end of headset enclosure 12. In the presently preferred embodiment of the invention, voice tube arm 16 is coupled to headset enclosure 12 with a ball-and-socket joint 18. Ball-and-socket joint 18 enables voice tube arm 16 (and hence voice transmitter 17) to extend out of headset enclosure 12 over a range of angles with respect to headset enclosure 12, as indicated by arrows 22.

The voice tube 20 is either rigid or semi-rigid and has an audio filter cap 21 at its distal end. Under the audio filter cap 21 there is an acoustic damper that damps standing waves in the tube 20. The voice tube 20 is slidably engaged over voice tube arm 16, facilitating rotation of voice tube 20 with respect to voice tube arm 16 (and hence headset enclosure 12) about a longitudinal axis 34, as indicated by arrow 24. This further enables the headset 10 to be used on either the left or right ear, and provides more precise positioning of the voice transmitter 17 relative to the user's mouth. The slidable engagement also further facilitates the telescoping extension or retraction of voice tube 20 with respect to headset enclosure 12, as indicated by arrow 26. The slidable and rotatable engagement of voice tube 20 over voice tube arm 16, and the degrees of freedom afforded by ball-and-socket joint 18 together serve to provide considerable flexibility in positioning the distal end of voice tube 20 adjacent to a wearer's mouth, affording a comfortable fit, and better communication of the user's voice to the voice transmitter 17.

Alternatively, the voice transmitter 17 may incorporate a boom microphone arrangement in place of the voice tube arrangement described. In this embodiment, a microphone housing is located at the end of a tube similar in construction to voice tube 20, without having the damping elements. The microphone for such an embodiment is preferrably a directional, noise-cancelling type. The voice transmitter 17 forms a hollow tube that passes electrical conductors from the microphone to transmitter circuitry in the headset enclosure 12. In this embodiment, variable angular positioning of the voice transmitter 20 may also be achieved by use of wire-shaped malleable, formable metal backbone covered by a flexible, plastic jacket, which also covers conductors from the microphone to the headset enclosure 12. The malleable, formable backbone allows for variable positioning of the distal microphone with respect to the headset enclosure 12. The backbone is coupled to a rotatable base, allowing for rotational positioning relative to axis 34.

Entering the headset enclosure 12 behind the earhook 13 is an electrical cable 40. Electrical cable 40 includes electrical leads (not shown) interconnecting circuitry in headset enclosure 12 to a suitable plug connector 42. In one embodiment, plug connector 42 is of the type disclosed in U.S. Pat. No. 5,259,780 to Morrissey III, et al., entitled "Quick Disconnect Wiring Connector." The Morrissey III et al. '780 patent is commonly assigned to the assignee of the present invention. The connection of electrical cable 40 to the headset enclosure 12 is protected by strain relief 14. The placement of the cable 40 behind the earhook 13 positions the cable 40 to hang behind the ear, rather than hanging straight down from the receiver enclosure 32 as would be the case if the cable 40 coupled to the receiver enclosure 32 directly, as in some conventional headsets.

As best observed in the front view of FIG. 2, headset enclosure 12 of headset 10 is symmetrical about a central vertical plane. Headset enclosure 12 may comprise two mating parts which are affixed to one another in a "clam shell" fashion as, for example, by pins, sonic bonding, or the like. It is contemplated that a variety of different assembly methods may employed for headset enclosure 12, allowing for the use of soft materials to fit and interface with the human ear for the purposes of enhanced comfort and fit. Headset enclosure cap 125 further aids in maintaining the coupling of the mating parts of the headset enclosure 12.

Referring again to FIG. 1, in accordance with another aspect of the present invention, receiver enclosure 32 is provided with socket 44 for receiving an earbud 46 adapted to rest against the opening of the ear canal. The earbud 46 has a mounting member for securely, yet detachably, engaging the socket 44. Earbud 46 may take one of several different configurations, to account for variations in users' ears and users' preferences. FIG. 1 and FIG. 4 show an earbud 46 made of soft rubber, with a generally mushroom-like configuration. FIG. 5 shows an alternate earbud 46' having a foam covering and a generally pill-shaped configuration. Several different configurations and sizes of earbuds 46 may be provided with the headset 10, such that an individual user can select one that he or she finds most preferable. Accordingly, earbuds 46 are designed to be readily detachable from receiver enclosure 32. The earbud 46 and socket 44 arrangement are further described below.

Figure 3A:
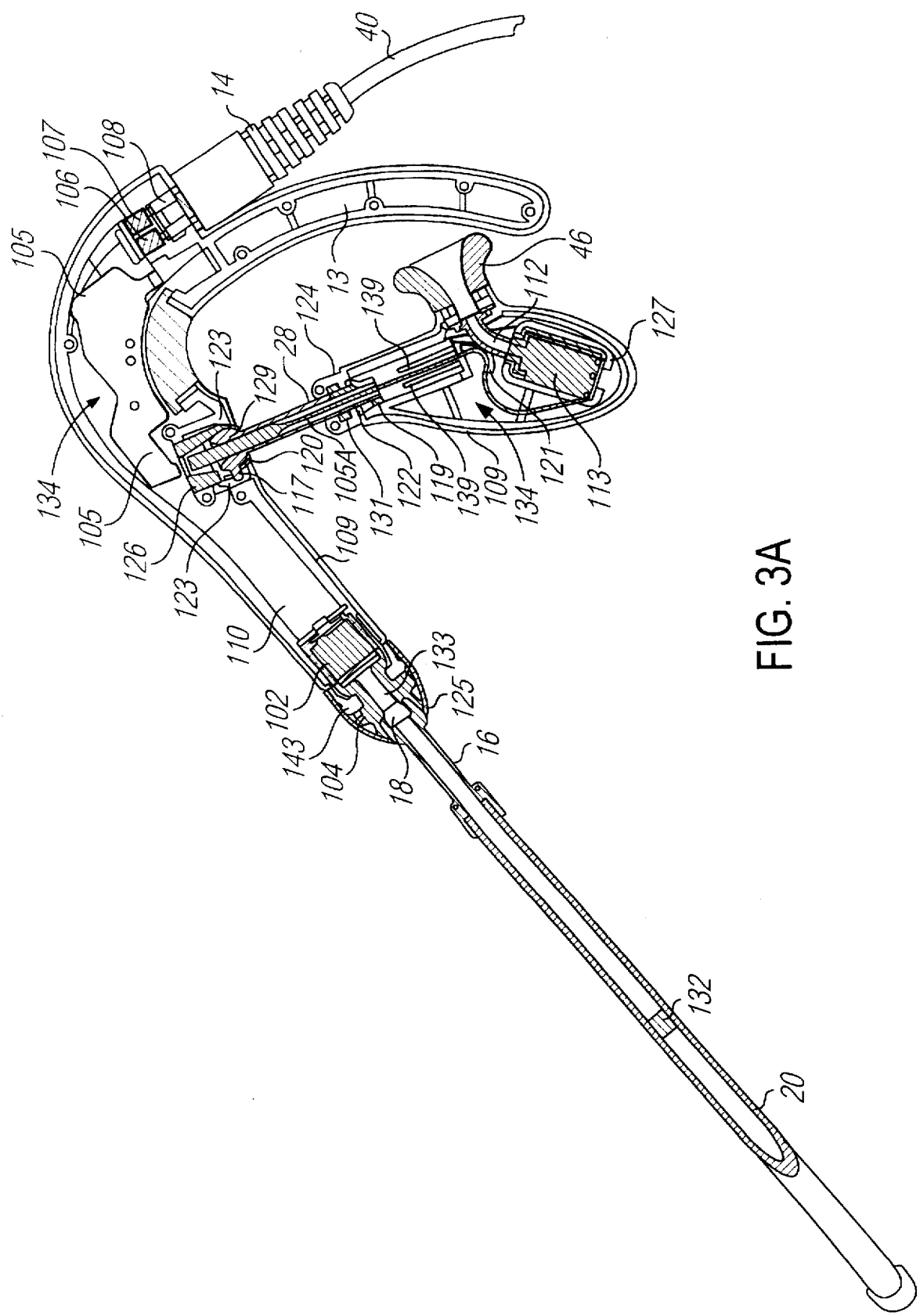
FIG. 3a is a cross-section view of the headset of FIG. 1.

Referring now to FIG. 3a there is shown a cross-sectional view of the headset 10 of FIG. 1 taken at the vertical midplane of the headset enclosure 12. The headset enclosure 12 forms a first cavity 134 encapsulating various electrical and mechanical components. The receiver enclosure 32 forms a second cavity 135 encapsulating a receiver transducer 113 and other electrical and mechanical components.

The receiver enclosure 32 is supported by the ball tube 28 which terminates in a ball 129 captured between receiver pivot ferrule 120 and friction boot 126 held in the headset enclosure 12 by pivot support walls 123. The receiver enclosure 32 pivots in all planes about the ball 129. The ball tube 28 and ball 129 are preferrably cast as single integrated piece. The angle of displacement is limited by tab 117 that slides in a vertical slot in ferrule 120, limiting angular position (as indicated by arrows 38 on FIG. 1) to about plus or minus 30° from axis 19. Tab 117, as resting in a vertical slot, prevents the ball 129 from any substantial rotation about axis 19.

The vertical placement, and angular rotation of the receiver enclosure 32 with respsect to the headset enclosure 12, as selected by the wearer, is rigidly maintained by the friction ring 131. The angular position is maintained by the friction boot 126 in the headset enclosure 12. Thus, while in use the position of the receiver enclosure 32 with respect to the headset enclosure 12 is substantially fixed, and does not pivot or rotate as the wearer's head is tilted. This improves the stability of the headset 10, since the receiver enclosure 32 maintains its position in the ear, and its relative position with respect to the headset enclosure 12. In addition, the substantial absence of movement eliminates the possibility of mechanical noise from such movement being picked up by the microphone 102, and thereby improves acoustic performance.

The ball 129 is bored through, and forms a third cavity which couples to the first cavity 134 of the headset enclosure 12, and which is further coupled to the second cavity 135 of the receiver enclosure 32 through the ball tube 28.

Electrical leads in cable 40 terminate at plug 108, which includes positive and negative pins for both receiver and transmitter circuits. Receiver flex circuit 105 couples to two receiver pins on plug 108 through with receiver sockets 106. Receiver flex circuit 105 then twists 90° and extends through the headset enclosure 12 and over the ball 129 of the ball tube 28. Receiver flex circuit 105 passes through the bore of ball 129, and down the length of the ball tube 28, forming another twist, the degree of which depends on the angle of rotation of the receiver enclosure 32 with respect to the headset enclosure 12. The inner edge of the ball 129 is beveled so as to not pinch the receiver flex circuit 105 as the receiver enclosure 32 is angled at its maximum offset. A tail portion 105a of the receiver flex circuit 105 containing two printed conductors passes through two vertical guides 139 which prevent the circuit from excessively bending and crimping in an S-shaped curve as the receiver enclosure 32 is moved up towards the headset enclosure 12 along ball tube 28.

Figure 3B:
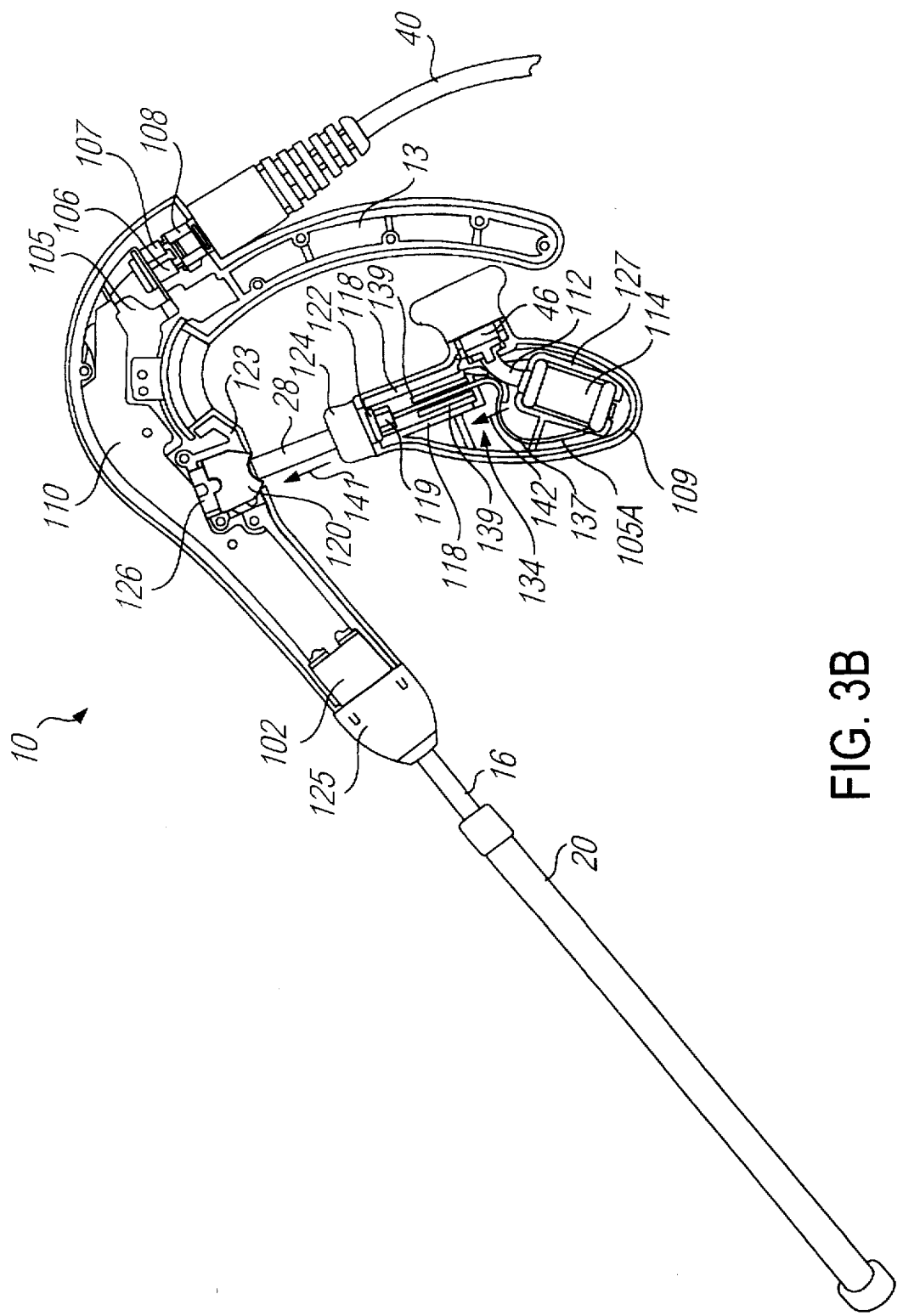
FIG. 3b is side view of the headset of FIG. 1.

Referring to FIG. 3b, there is shown a side view of headset enclosure 12, as viewed without one mating side of the headset enclosure 12 and receiver enclosure 32. Inside the receiver enclosure 32, the ball tube 28 is centered between the cylinder walls 118 by the ball tube support clip 122 which snaps around the ball tube 28 just above the stop tab 119. Support clip 122 moves vertically as the receiver enclosure 32 is moved along the ball tube 28. Stop tab 119 limits the rotation of the receiver enclosure 32 on the ball tube 28 to about 330° degrees so as to prevent complete twisting of the receiver flex circuit 105 inside the ball tube 28.

Conductors at the far end of the tail of receiver flex circuit 105 are soldered to the solder pads 116 on the receiver transducer 113. As the receiver enclosure 32 telescopes up the ball tube 28 as shown by arrow 141, the surplus length of the tail 105a is guided smoothly into a take up loop 137 by the curved flex guide 121, as shown by arrow 142. The connection is maintained during rotating of the receiver enclosure 32 by the twisting of the tail 105a inside the ball tube 28. The three motions of the receiver enclosure 32 with respect to the headset enclosure 12 allow a wearer of the headset 10 to locate the earbud 46 properly in the cavuum of the ear for best hearing and support.

The receiver transducer 113 is mounted in a rubber isolation boot 114 held in position by raised walls 127 internal to the receiver enclosure 32. The rubber boot 114 fits tightly around the transducer case to prevent any sound leakage into the receiver enclosure 32, through the ball tube 28 to the headset enclosure 12 and microphone 102. The boot 114 also provides vibration isolation from the receiver enclosure 32 and ultimately reduces the energy picked up by the microphone 102. A portion of the molded boot 114 forms an acoustic channel 112 which carries sound from the transducer 113 to the earbud 46.

The right and left halves of the receiver enclosure 32 are held together by the receiver cap 124 and an ultrasonic weld flange 109 around most of the mating surfaces of the receiver enclosure 32. Welding the two halves together increases the voltage necessary to cause a breakdown between the transducer 113 or its flex connection and the outside of the housing.

Headset enclosure 12 also encapsulates transmitter flex circuit 110, which couples by sockets 107 to transmitter pins on plug 108. Transmitter flex circuit 110 also couples to microphone 102. Referring to FIG. 3a, the microphone 102 couples to voice tube arm 16 through transmit acoustic channel 133, which is formed by transmit friction boot 104. Transmit ferrule support 143 holds the transmit friction boot 104 in place, which maintains the angular position of voice transmitter 17 through angular displacement of ball and socket joint 18. An acoustic damper 132 on the distal end of the voice tube arm 16 serves to damp and filter selected frequency components prior to conduction to the microphone 102, and reduces standing waves in the voice tube arm 16.

Referring to FIG. 4 and FIG. 5, there is shown one embodiment of the mounting member of the earbud 46. In this embodiment, the mounting member is a bayonet type fitting, formed by radially-projecting fingers 50 on the base 52 of each earbud 46. An enlarged, frontal view of socket 44 for this embodiment is shown in FIG. 6. Socket 44 incorporates two J-type grooves 48 which are engaged by the fingers 50 with a quarter turn. Within socket 44 resides flange 45, extending from the boot 114, to mate with the end of the earbud 46. Centered in the flange 45 is the acoustic channel 112 that transmits sound from the transducer 113 through the earbud 46 to the user's ear. While a bayonet-type mounting of earbud 46 is one preferred embodiment of the invention, it is contemplated that other detachable coupling mechanisms may be employed. For example, the socket 44 may be threaded with a first threaded portion, and the earbud 46 may have a second threaded portion that screws into the socket. Alternatively, and earbud 46 could have raised detents that snap into corresponding depressions in the walls of the socket 44.

Figure 7:
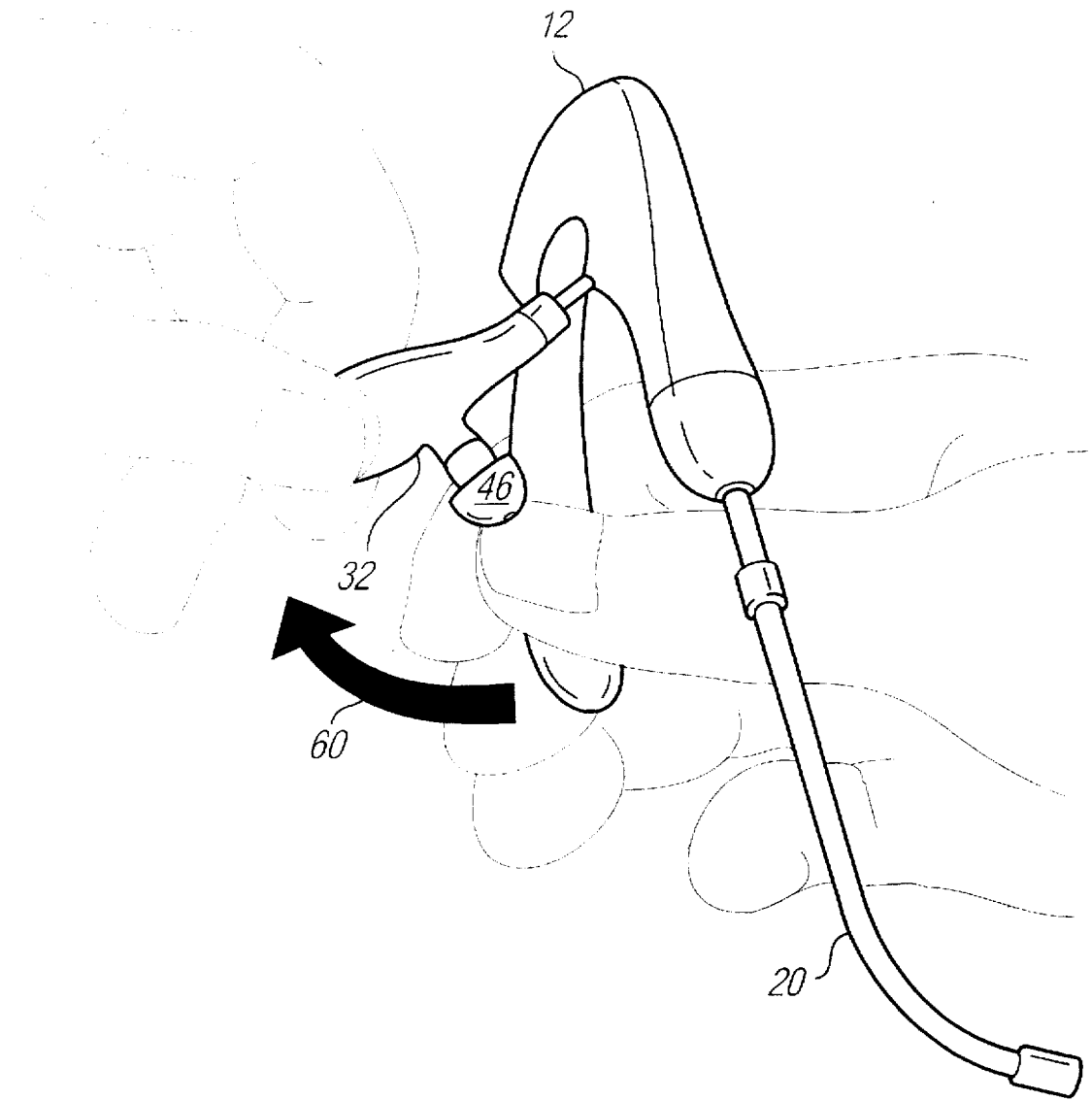
FIG. 7 is an illustration of a user positioning the receiver enclosure prior to application of the headset.
Figure 8:
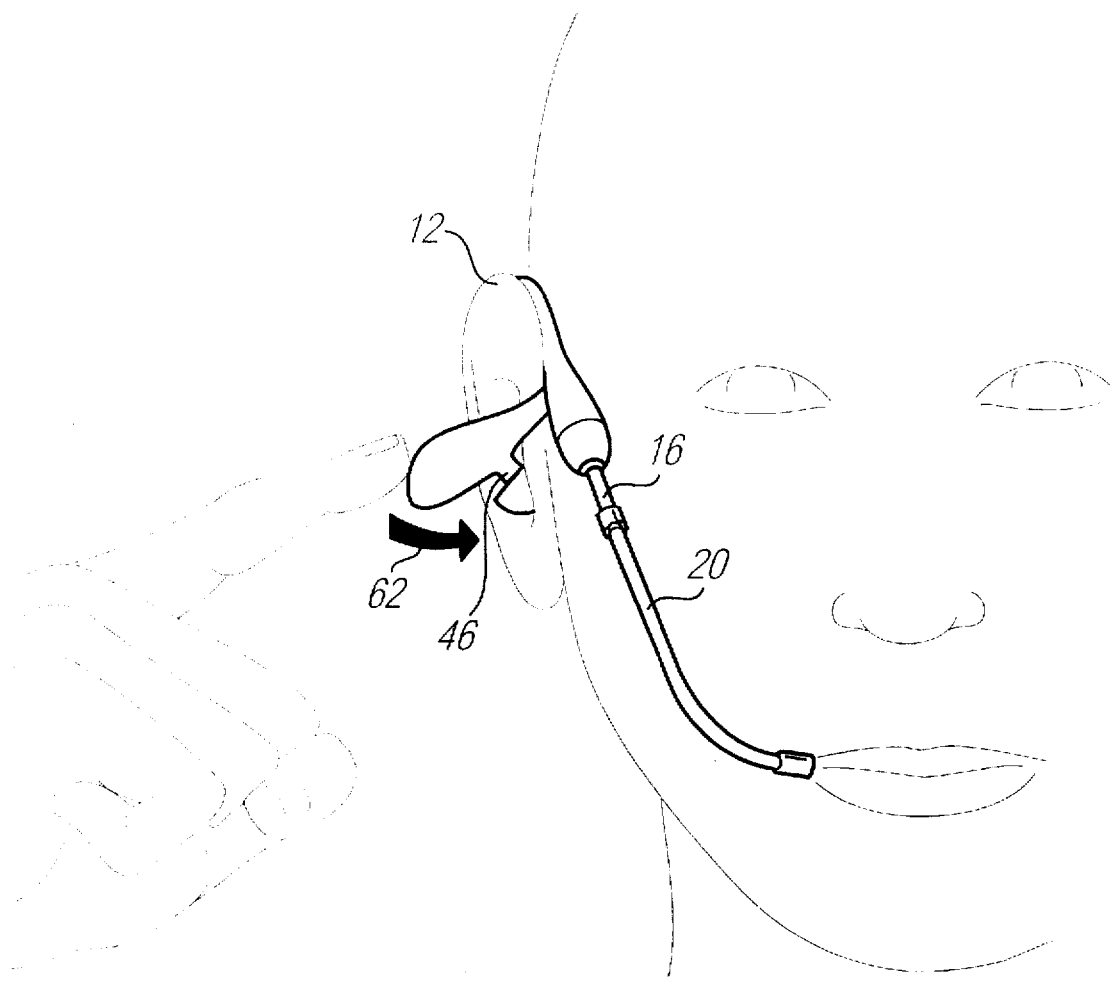
FIG. 8 is an illustration of a user positioning the receiver enclosure in the ear.

When assembled, the body of the headset enclosure 12 is contoured to fit snugly but comfortably adjacent a user's head. The manner in which headset 10 is fitted onto a human ear is depicted with reference to FIGS. 7–10. In FIG. 7, the receiver enclosure 32 is swung outward, as indicated by the direction of arrow 60. This motion, which is made possible due to degree of freedom afforded by the ball tube 28, facilitates fitting headset enclosure 12 over the user's ear in a post-auricular fashion, as depicted in FIG. 8. After this is done, the receiver enclosure 32 is gently pushed toward the user's ear, as indicated by arrow 62 in FIG. 8, such that the earbud 46 comes to rest in the concha between the tragus and anti-tragus and directly in front of the opening of the ear canal. The surface of the earbud 46 preferrably contacts with the skin of the auditory meatus, providing an acoustic seal therebetween, and blocking external noises from entering the ear canal and interfering with the signal from the transducer 113.

Figure 9:
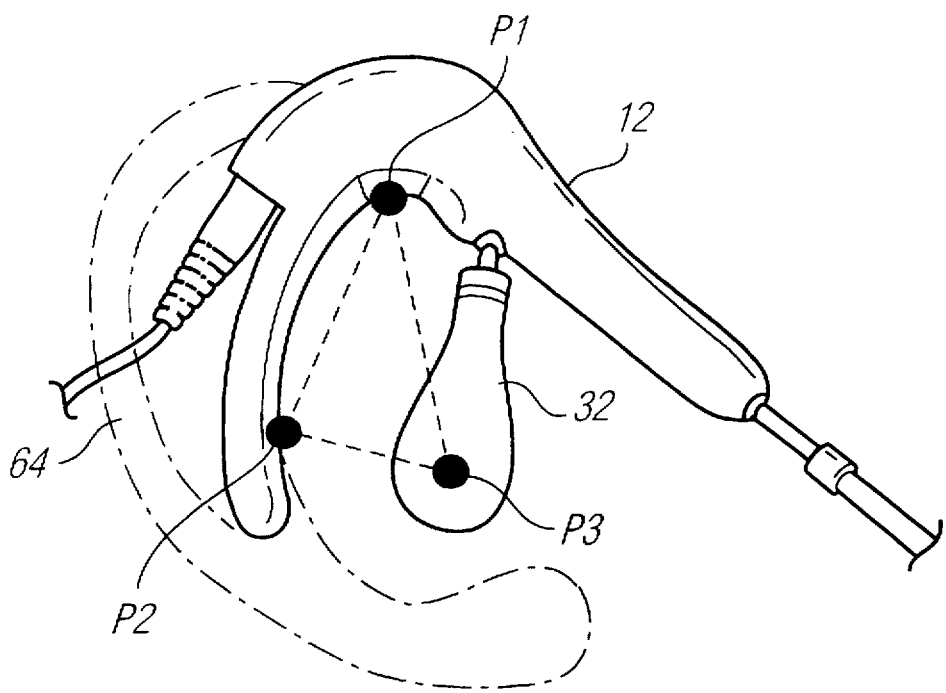
FIG. 9 is an illustration of the trilateral support locations of the headset of the present invention.

As applied to the ear, headset 10 is tri-laterally supported, in that support is provided as a result of headset enclosure 12 impinging up on the wearer's ear at first and second points behind the outer ear, and of earbud 46 impinging upon a third point, in the concha, over the user's ear canal. The triangulation of support points is illustrated in FIG. 9. A first support point P1 is located at about the apex of the curve of headset enclosure 12, where the user's ear 64 (shown in phantom in FIG. 9) joins the head at its highest point on the head. A second support point P2 is located at a lower position behind the user's ear—the precise location will vary from user to user—at a lower point on the curvature of headset enclosure 12. A third support point P3 is where earbud 46 rests over the user's ear canal in the concha.

Figure 10:
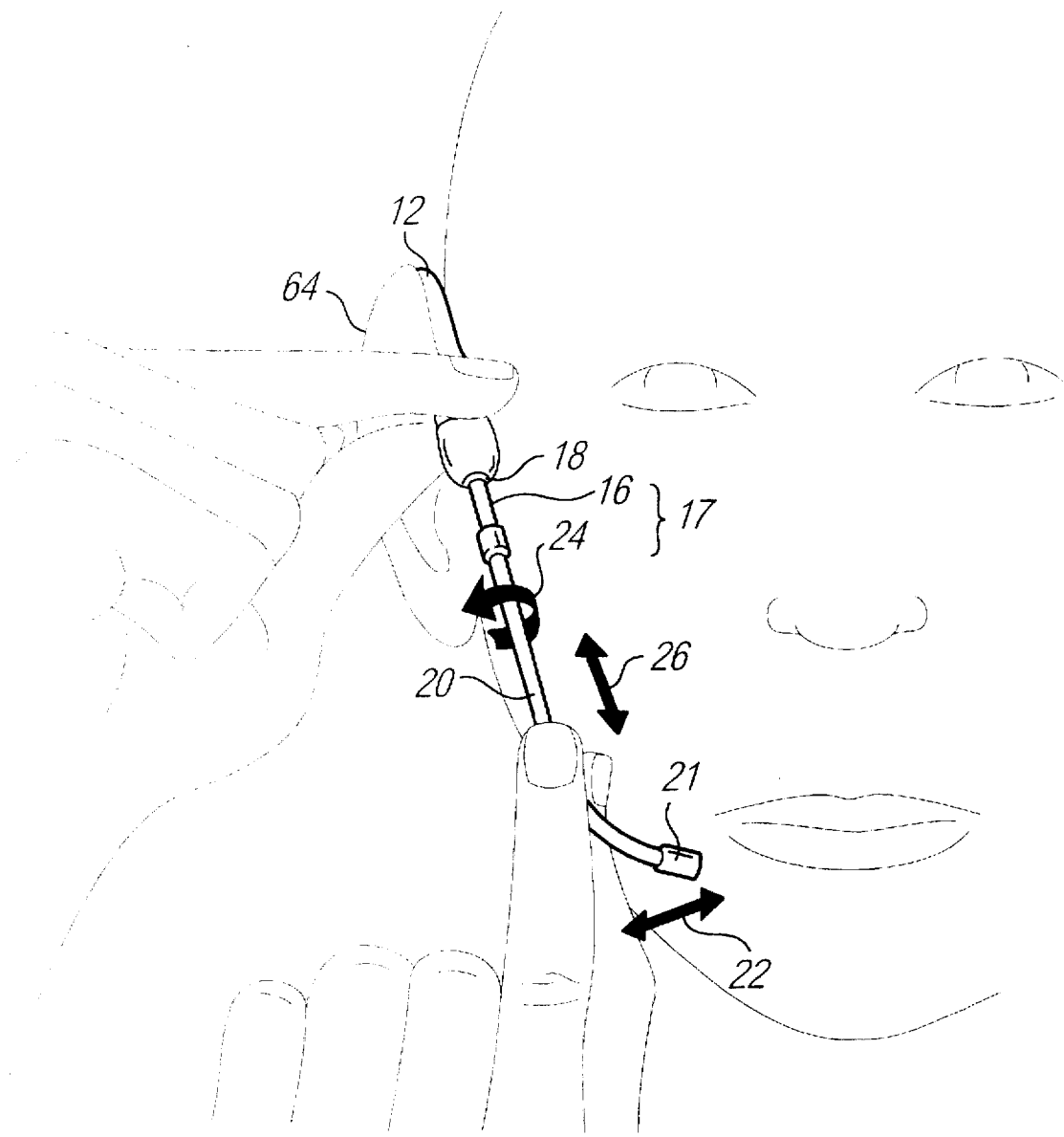
FIG. 10 is an illustration of a user positioning the voice transmitter.

Once headset 10 is fitted onto the user's ear, it is useful to articulate or adjust voice tube 20 such that its distal end is disposed generally in front of the corner of the user's mouth. This adjustment is depicted in FIG. 10. As previously noted with reference to FIG. 2, the position of voice transmitter 17 is universally adjustable, as indicated by arrows 22 indicating angular displacement, arrows 24 indicating rotation about axis 34, and arrows 26 indicating extension along axis 34. This adjustability arises as a result of the degrees of freedom afforded by ball-and-socket joint 18 and the sliding or telescoping interconnection between voice tube 20 and voice tube arm 16.

With the tri-lateral support system used in headset 10, user comfort is enhanced by virtue of a reduced size of the ear hook 13 and less reliance on the mastoid structure to hold the headset 10 tightly to the head. User comfort and acoustic performance are also increased by the adaptable positioning of the receiver enclosure 32 with respect to the headset enclosure 12. This also improves the quality of sound at headset 10 over other headsets because a good acoustic coupling is provided with the earbud 46 positioned within the concha of the ear, as desired by the user for comfort, stability, and performance.

The foregoing description of the invention has been directed to an illustrative embodiment for purposes of explanation and illustration of various aspects of the invention. It will be apparent to those skilled in this art, however, that many substitutions, modifications and alterations to the disclosed embodiment may be made without departing from the scope of the invention. For example, the electronics may be mounted at various places within the headset enclosure and/or receiver enclosure. One alternative embodiment specifically contemplated is one in which the microphone is disposed generally at or near the distal end of the voice transmitter, rather than in the headset enclosure, which in this alternative embodiment would be more accurately referred to as a microphone boom.

Also, the shape and size of both the headset enclosure and the receiver enclosure could vary. The receiver enclosure may be mounted in the ear hook with the sound conducted to the ear via an attachment member disposed in different positions than described, but providing the same degree of freedom of position and movement. In addition, various other forms of the attachment member may be employed other than the ball tube and socket. In one alternative embodiment, a universal joint, surrounded by a protective covering, may be used to couple the receiver enclosure to the headset enclosure. A universal joint provides approximately the same degrees of freedom as the ball tube implementation, allowing the receiver enclosure to be positioned as various angular locations with respect to the headset enclosure. The receiver flex circuit or simple electrical leads would then pass from the headset enclosure, under the protective cover, to the receiver enclosure. In another alternative embodiment, the attachment member may be a flexible tube coupled between the receiver enclosure and headset enclosure and having the first axis pass through it. The flexible tube, formed for example, of a corrugated or similar material, should be sufficiently rigid so as to hold any position imposed on it by the user. Again, the electrical conductors from the receiver circuitry would pass through the tube to the transducer in the receiver enclosure.

We claim:

1. A communication headset, comprising:
   a headset enclosure enclosing a first cavity and adapted to curve partially around and behind a user's ear in substantially a first plane, the headset enclosure coupled to an electrical cable including a plurality of electrical conductors;
   an attachment member movably coupled to the headset enclosure; and,
   a receiver enclosure coupled to the attachment member and enclosing a receiver transducer in a second cavity, the second cavity coupled through the attachment member to the first cavity of the headset enclosure to pass electrical conductors from the headset enclosure to the receiver transducer to convert an electrical signal to an acoustic signal, the receiver enclosure axially movable along a first axis both toward and away from the headset enclosure with the first cavity remaining coupled to the second cavity, and the electrical conductors comprising a flex circuit that forms a take up loop as the receiver enclosure is axially moved along the first axis toward the headset enclosure.

2. The communication headset of claim 1, wherein the attachment member comprises:
   a universal joint coupled between the receiver enclosure and the headset enclosure at the attachment member with the first axis of the receiver enclosure passing through the universal joint to allow the receiver enclosure to be disposed with respect to the headset enclosure at any of the plurality of angles that either pass through, or lie in, the first plane of the headset enclosure, the universal joint further allowing the receiver enclosure to be rotatable about the first axis.

3. The communication headset of claim 1, wherein the attachment member comprises:
   a flexible member coupling the first cavity of the housing enclosure to the second cavity of the receiver enclosure at the attachment member to pass the electrical conductors from the first cavity of the headset enclosure to the second cavity of the receiver enclosure and to allow the receiver enclosure to be disposed with respect to the headset enclosure at any of the plurality of angles that either pass through or lie in the first plane of the headset enclosure.

4. The communication headset of claim 1, wherein the receiver enclosure further comprises:
   an earbud socket;
   an earbud having a mounting member that detachably couples to the earbud socket, and sized to fit within a concha and between a tragus and anti-tragus and directly in front of an opening of the ear canal, to stabilize the headset on ear.

5. The communication headset of claim 4, wherein:
   the earbud socket includes at least one J-groove; and,
   the mounting member of the earbud includes at least one finger, each finger engaging a J-groove of the earbud socket to couple the earbud to the earbud socket.

6. The communications headset of claim 1, wherein the receiver enclosure further comprises:
   a curved flex guide positioned within the receiver enclosure to contact the flex circuit and guide the flex circuit into the take up loop.

* * * * *